Jan. 24, 1961  A. A. PFEIFER ET AL  2,968,933
STORAGE AND SHIPPING CONTAINER
Filed Feb. 9, 1959  6 Sheets-Sheet 1
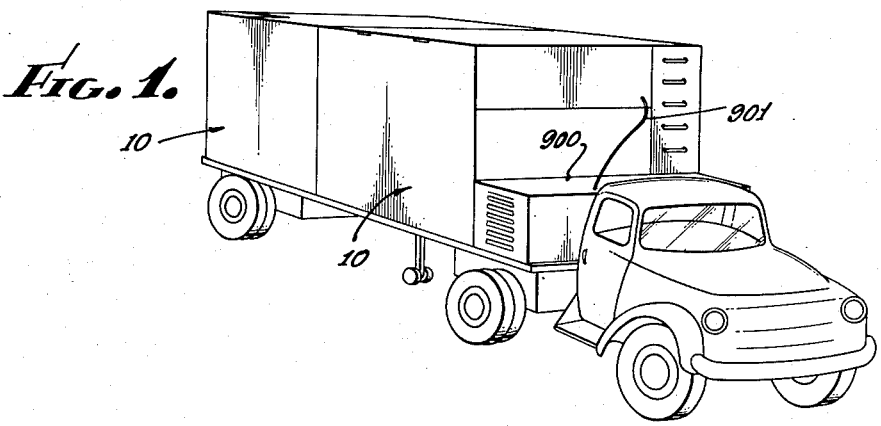
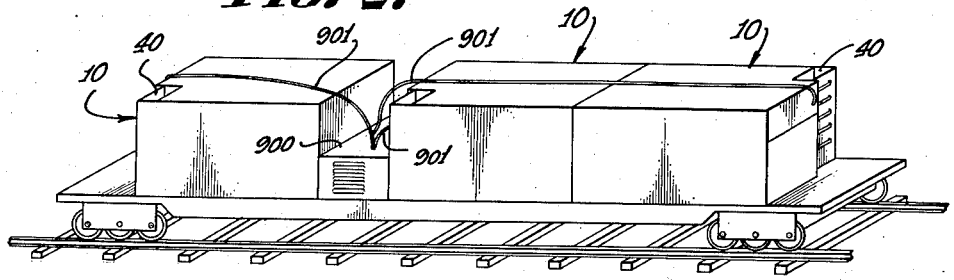
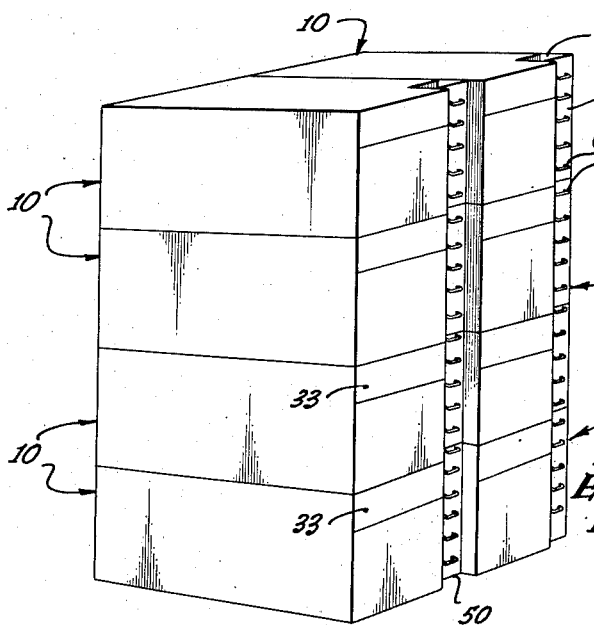
ARTHUR A. PFEIFER
ERWIN S. DE MOCSKONYI
RICHARD E. VON BERG
INVENTORS.
BY *Huebner & Worrel*
ATTORNEYS.

Jan. 24, 1961 A. A. PFEIFER ET AL 2,968,933
STORAGE AND SHIPPING CONTAINER
Filed Feb. 9, 1959 6 Sheets-Sheet 2
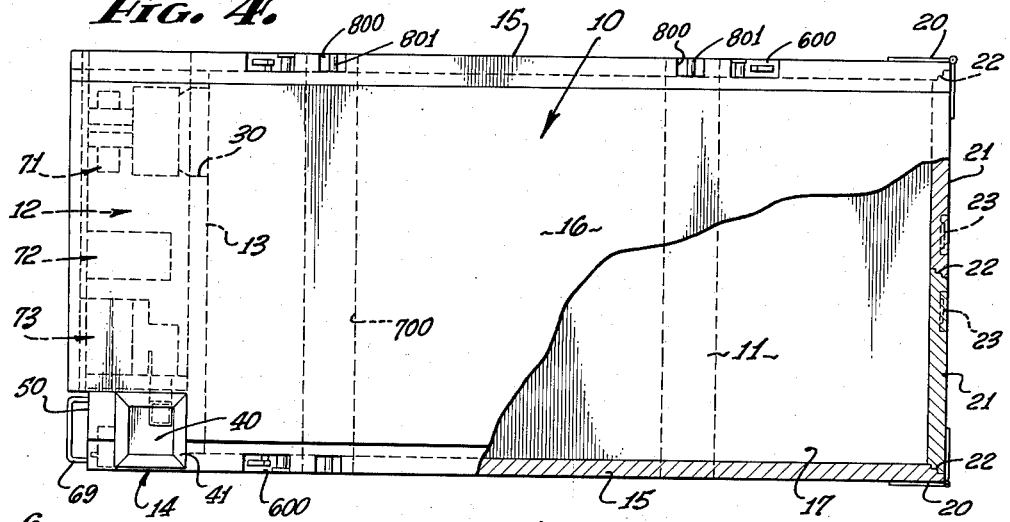
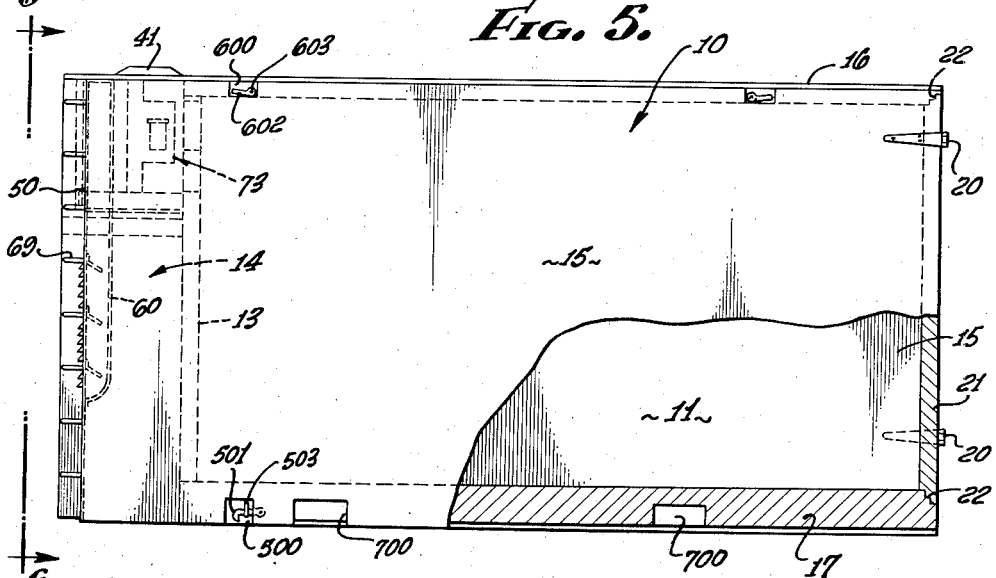
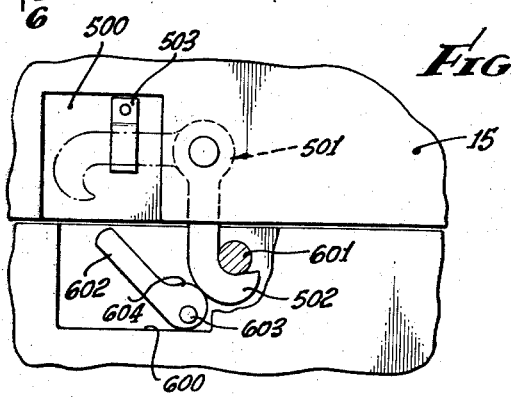
ARTHUR A. PFEIFER
ERWIN S. DE MOCSKONYI
RICHARD E. VON BERG
INVENTORS
BY Huebner & Worrel
ATTORNEYS.

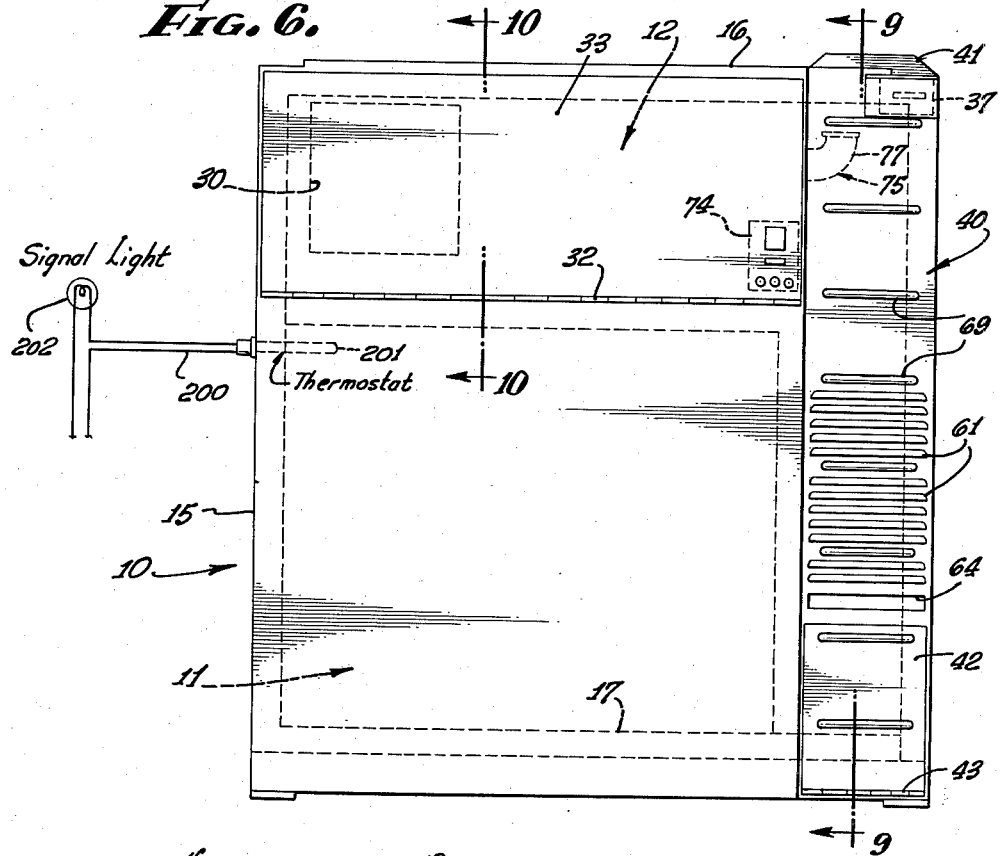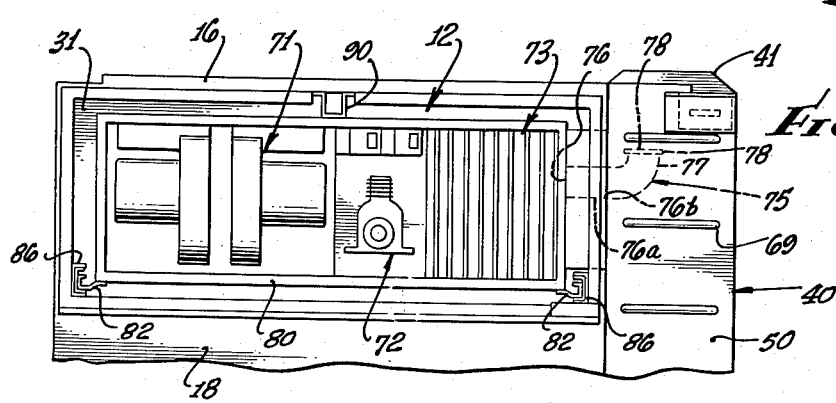

Jan. 24, 1961  A. A. PFEIFER ET AL  2,968,933
STORAGE AND SHIPPING CONTAINER
Filed Feb. 9, 1959  6 Sheets-Sheet 4
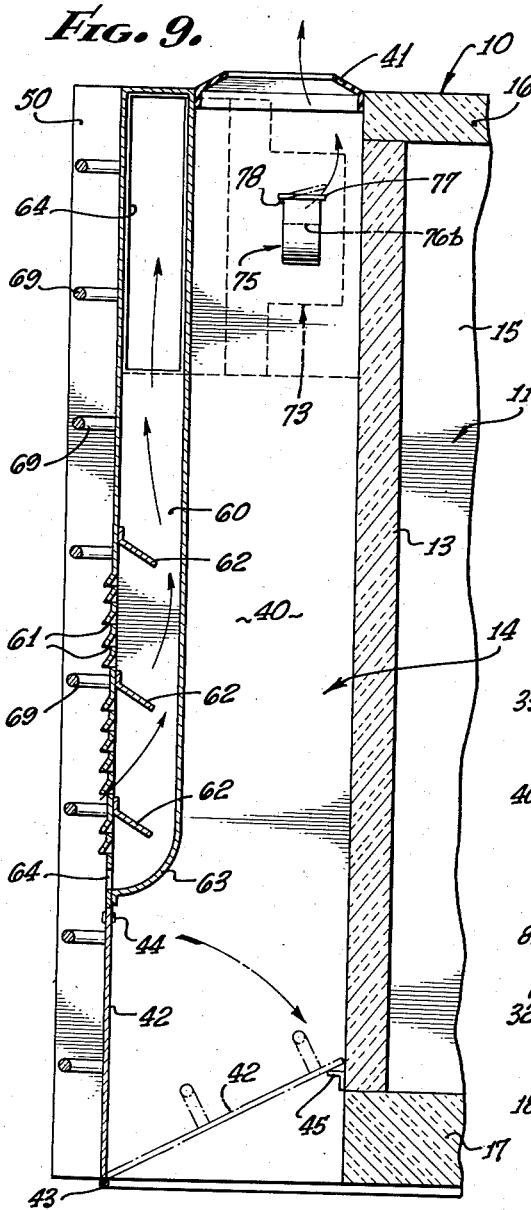
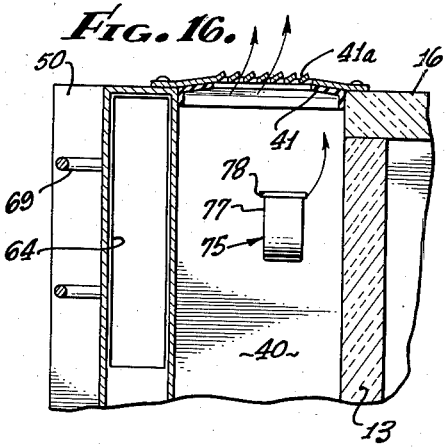
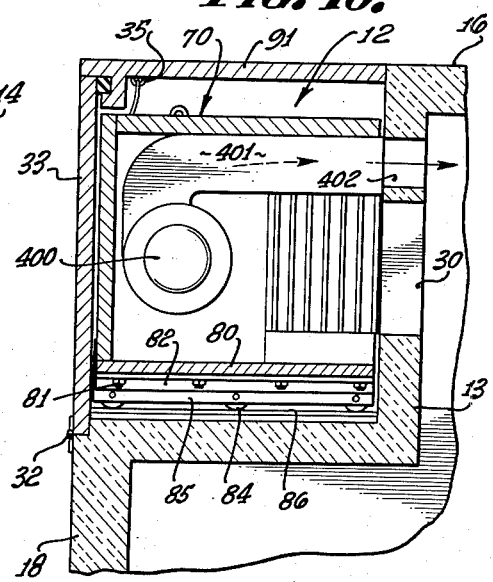
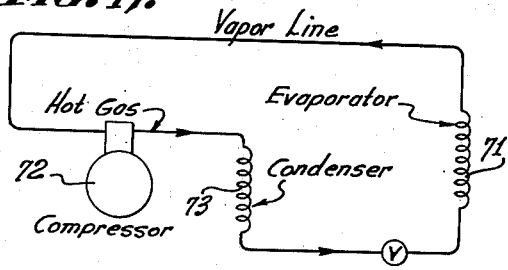
ARTHUR A. PFEIFER
ERWIN S. DE MOCSKONY
RICHARD E. VON BERG
INVENTORS
BY Huebner & Worrel
ATTORNEYS.

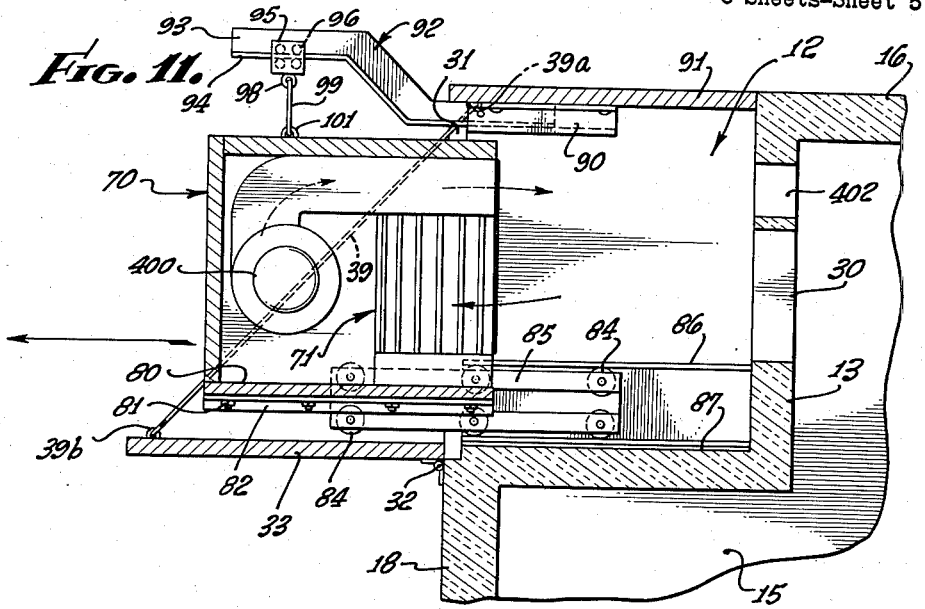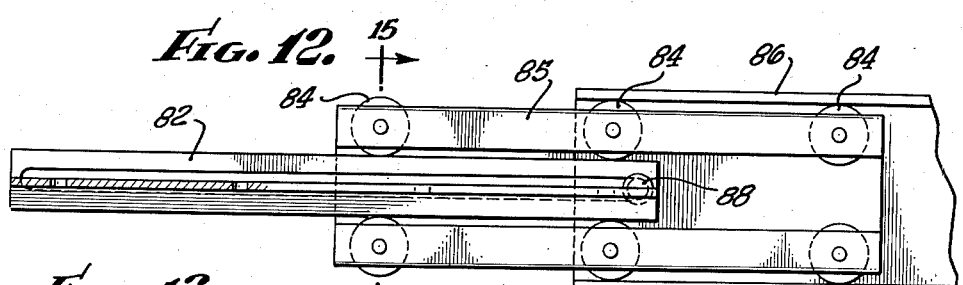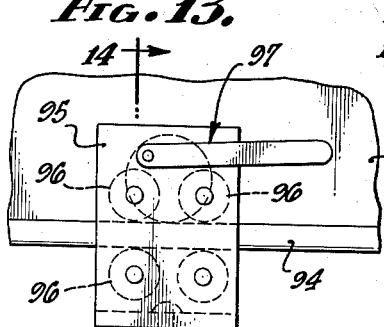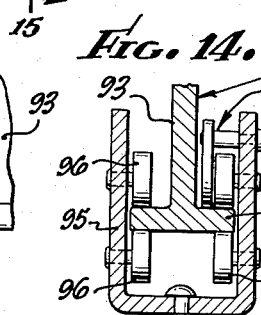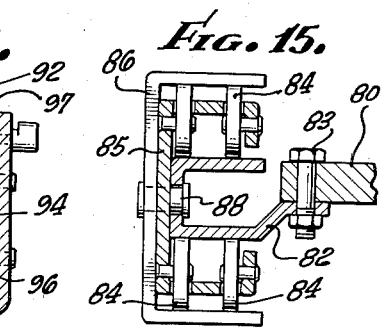

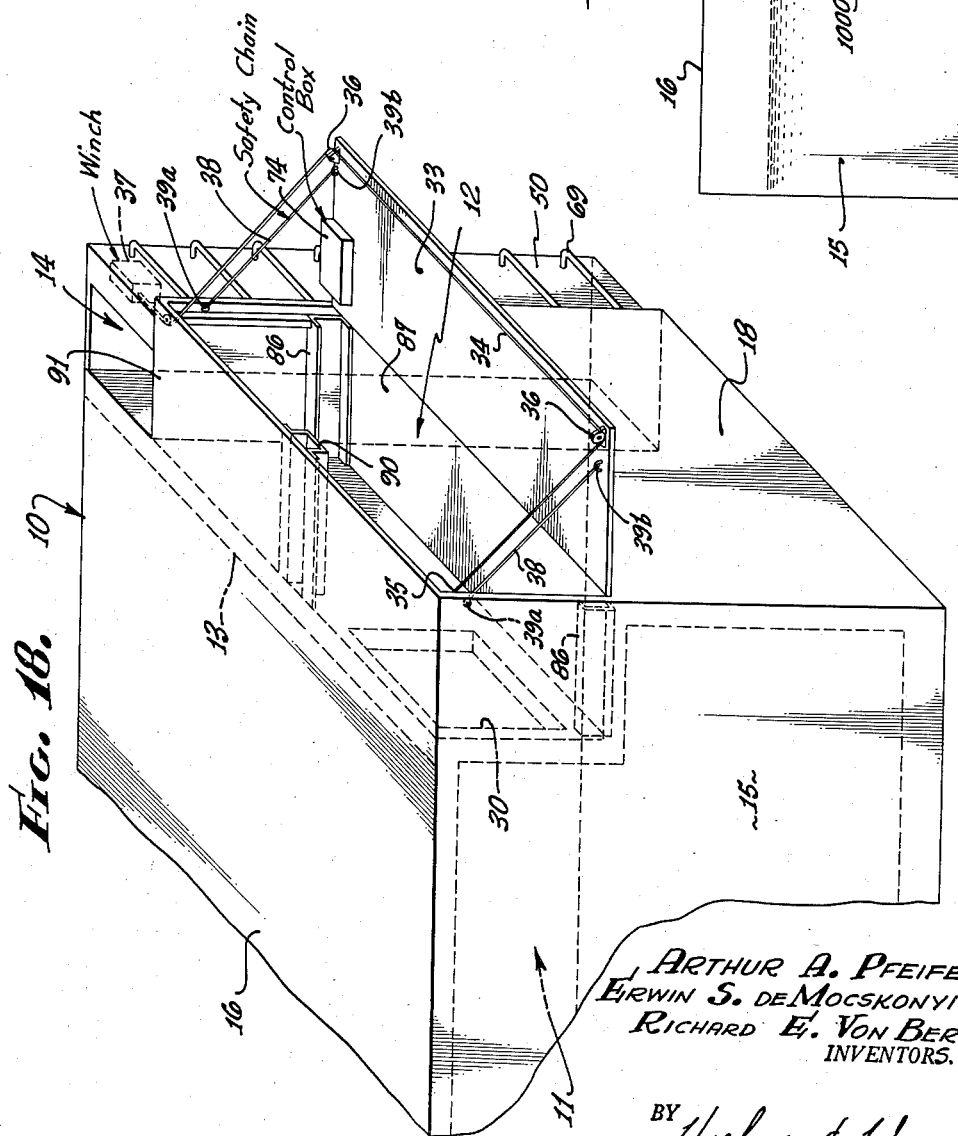

United States Patent Office 2,968,933
Patented Jan. 24, 1961

2,968,933

STORAGE AND SHIPPING CONTAINER

Arthur A. Pfeifer, Whittier, Erwin S. de Mocskonyi, Anaheim, and Richard E. Von Berg, Whittier, Calif., assignors to Rheem Manufacturing Company, New York, N.Y., a corporation of California Filed Feb. 9, 1959, Ser. No. 792,105

8 Claims. (Cl. 62—176)

This invention relates to a container for cargo storage and shipment having a self-contained controlled-temperature environment and humidity control means.

Long distance shipment of perishable cargos, notably foodstuffs, frequently requires constant temperature environment and humidity control. "Dry Ice" refrigeration, for example, has sometimes been used successfully in such shipments, but is subject to many limitations. For instance, Dry Ice refrigeration is not satisfactory for long distance shipping because the refrigerant is exhausted in a relatively short time, and furthermore, exact temperature and humidity control is not possible when Dry Ice is used.

Resort is normally had to refrigerated trucks, freight cars, and ships, but such means of specialized transportation are expensive and frequently in relatively short supply, so that they are not always available where and when desired. Furthermore, it is generally not feasible to apply temperature or humidity control to less than the entire contents of the truck, freight car, or ship's hold, or to selectively apply different temperature or humidity control to separate parts of a single shipment.

Another disadvantage of shipment by refrigerated truck, freight car or ship is that mechanical breakdown of the refrigeration system or temperature control will often be difficult to correct rapidly, and loss of an entire cargo may result.

A further drawback to shipment by refrigerated truck, freight car or ship is that transfer from one temperature-controlled means of transportation to another requires handling and affords opportunity for loss of temperature control, contamination and spoilage in movement of the perishable cargo from one means of transportation to another.

For instance, under present conditions, if beef is to be shipped, say, from a slaughterhouse located inland in Australia to a cold storage warehouse inland in continental United States, it is necessary to move the beef out of a refrigerated room in the slaughterhouse into, perhaps, a refrigerated truck, with contamination possible during the handling of the beef. When the beef is then carried by truck to a rail head, it is again necessary to move the beef out of the refrigerated truck and into a refrigerated freight car, with contamination danger again present. When the freight car has arrived at a shipping port, the beef cargo must be moved again, out of the refrigerated freight car and into the refrigerated hold in a ship, and when the ship arrives at its port of destination, the beef must be successively re-handled in removing it from the ship's hold to, in turn, a refrigerated freight car and a refrigerated truck, and then into the inland cold storage warehouse.

It is an object of the present invention to provide a container having a self-contained controlled-temperature environment and humidity control means, which container may be packed with a perishable cargo, sealed shut at a point of origin, such as the Australian slaughterhouse in the example given above, and opened only at the point of destination, the inland cold storage warehouse in said example.

A further object of the invention is to provide a container of the character described, the self-contained controlled-temperature environment and humidity control means of which may be quickly and easily attached to a conventional source of power supply.

Another object of the invention is to provide a cargo container for perishable cargos which may be easily and securely stacked with other similar containers.

A further object of the invention is to provide a container of the character described in which the self-contained controlled-temperature environment and humidity control means are readily accessible for quick repair, removal and replacement.

Another object of the invention is to provide a container of the character described which has venting means capable of ready connection with venting means of similar containers stacked thereon.

A further object of the invention is to provide a container of the character described which is of sufficient size to permit simple cargo handling.

Another object of the invention is to provide a container of the character described which is of sturdy construction, affording sufficient protection to its cargo and temperature and humidity control means, but which is still capable of relatively easy cargo movement.

A further object of the invention is to provide a container of the character described which is relatively simple of construction, and easy to operate and maintain.

With these and other objects in view, the invention consists of the construction, arrangement and combination of the various parts of the device whereby the objects contemplated are attained, as hereinafter set forth, pointed out in the appended claims and illustrated in the accompanying drawings.

In the drawings:

Figure 1 is a perspective view of two of the containers mounted on a truck or trailer unit.

Figure 2 is a perspective view of three of the containers mounted on a flat car.

Figure 3 is a perspective view of two stacks of four containers each, stacked one upon the other.

Figure 4 is a top plan view of a container, partially cut away.

Figure 5 is a side elevation of a container, also partially cut away.

Figure 5a is an enlarged diagrammatic detailed view of the latch means for securing two containers in stacked relationship to each other.

Figure 6 is an end view taken on line 6—6 of Figure 5, with the door to the equipment compartment in closed position.

Figure 7 is an end view similar to the upper portion of Figure 6, but with the door to the equipment compartment in open position.

Figure 8 is a detailed view of an alternative form of vent-connecting tube, enlarged and partially cut away.

Figure 9 is an enlarged vertical cross-section taken on the line 9—9 of Figure 6.

Figure 10 is an enlarged vertical cross-section taken on the line 10—10 of Figure 6, showing an evaporator mounted in the equipment compartment, with the door to the equipment compartment in closed position.

Figure 11 is a section similar to Figure 10, but with the door to the equipment compartment in open position.

Figure 12 is an enlarged view of the roller assembly shown in the lower portion of Figure 11.

Figure 13 is an enlarged detailed view of the hoist shown in the upper portion of Figure 11.

Figure 14 is a cross-section taken on line 14—14 of Figure 13.

Figure 15 is a cross-section taken on line 15—15 of Figure 12.

Figure 16 is an enlarged view of an alternative form of the upper part of the device shown in Figure 9.

Figure 17 is a diagrammatic illustration of a standard air cooling system for use in the container.

Figure 18 is a diagrammatic pictorial illustration of the device, partially cut away.

Figure 19 is a diagrammatic view of an alternate form of a cooling system for operation with the device.

A container 10 is basically composed of a storage compartment 11; a compartment 12 for temperature environment and humidity control equipment, separated from storage compartment 11 by temperature-insulated divider wall 13; and a vent stack 14. Side walls 15, top 16, bottom 17, and the lower portion of front wall 18 of container 10 are temperature-insulated when they form the walls of storage compartment 11.

Mounted by hinges 20 to side walls 15 are temperature-insulated doors 21 having mating airtight edges 22 and releasable latch means 23 of any standard design.

In Figure 4 of the drawings is shown a pair of doors 21, each mounted on a side wall 15, but it will be apparent that either double doors or a single door giving access to storage compartment 11 may be utilized and may be mounted by hinges on side walls 15, on top 16, on bottom 17, on front wall 18 in the lower portion thereof below equipment compartment 12, or on any combination of the walls of storage compartment 11.

Equipment compartment 12 is disposed between front wall 18 and divider wall 13, preferably in the upper part of container 10. Divider wall 13 has an opening 30 for air exchange when container 10 is used for dry cargo storage, or for insertion of coils when container 10 is used for liquid cargo storage, both in the manner hereinafter described.

Equipment compartment 12 has an open front 31, and mounted on front wall 18, by hinges 32, is a door 33. Cable 34 is rigidly fastened at one end thereof, as at 35 in Figure 18, is disposed in pulleys 36 mounted on door 33, and is then disposed with its free end wound on winch 37 of standard construction. Safety cables or chains 38 are rigidly fastened at one end thereof to the container, as at 39a in Figure 18, and at the other end thereof to door 33, as at 39b.

Disposed between front wall 18 and divider wall 13, laterally of equipment compartment 12, is venting stack 40, having upwardly and inwardly directed, flexible, flanged gasket 41 mounted at the upper end thereof. In the alternative form of the container shown in Figure 16, a louver 41a may be provided. Where front wall 18 forms one side of venting stack 40, it is recessed, as at 50.

The lower portion of recess 50 is cut to form door 42, mounted by hinges 43 on bottom 17. Door 42 is adapted to swing inwardly from the upper end thereof, and form a water outlet chute for vent 40 when in open position. Door 42 is held in closed position by suitable releasable latch means 44. Stop 45 is provided in divider wall 13, and door 42 rests on said stop 45 when in open position.

An air intake stack 60 is mounted internally in venting stack 40. Louvers 61 are provided to give air access to air intake stack 60 from recess 50 in front wall 18. Mounted in association with louver 61 and disposed in air intake stack 60 are baffles 62. Air intake stack 60 has a lower curved surface 63 forming the bottom thereof, and acting similar to door 42 as a water outlet chute in conjunction with an opening 64 in recess 50. An opening 64 provides air access from air intake stack 60 to equipment compartment 12, frame 70, evaporator 71, compressor 72, and condenser 73.

Ladder rungs 69 are provided in recess 50. In order to permit close packing of containers it has been found advantageous to dispose rungs 69 entirely within recess 50 so that they do not protrude beyond the outside surface of wall 18. Thus, if front wall 18 is placed close against another container or wall, it presents a flat surface, and recess 50 acts as an air inlet passageway.

Mounted in equipment compartment 12, in the manner hereinafter described, is an open-ended frame 70, in which is mounted, in series, a standard evaporator 71, compressor 72, and condenser 73, the series being connected in turn to temperature and humidity control unit 74, which may be conveniently mounted on door 33. An opening 76 in frame 70 gives access to exhaust air vent 75, mounted in openings 76a and 76b in the side walls of compartment 12 and vent stack 40 respectively. Said vent 75 permits the escape of exhaust air from compartment 12 and condenser 73 into venting stack 40. Exhaust air vent 75 is preferably formed with an upwardly bending elbow 77, and may be equipped with a spring-mounted valve 78, arranged to open when air is being exhausted, but to seal vent 75 against water if, for instance, water should enter vent stack 40 between flanges 41.

Frame 70 is freely disposed in compartment 12 and is seated on truck platform 80, resting on studs or feet 81. Truck platform 80 is mounted on a pair of frames 82 by any suitable means, such as bolt and nut means 83. Frames 82 are slidably disposed between a series of rollers 84, mounted in turn on roller supports 85. Roller supports 85 and rollers 84 are slidably disposed in U-channels 86, rigidly mounted on floor 87 of compartment 12 at opposite sides thereof, to form a pair of tracks. Appropriate stops, such as 88, are provided. Frame 70 and its entire contents may thus be readily moved into and out of compartment 12.

An open-end channel 90 is mounted on the top side 91 of compartment 12 and disposed between top side 91 and frame 70 at the approximate center of top side 91. Slidably and removably disposed in channel 90 is goosenecked T-beam 92 formed of body 93 and cross-bar 94. A U-shaped block 95 has parallel series of rollers 96 arranged so that cross-bar 94 of T-beam 92 may be disposed between pairs of rollers 96 which bear on the top and bottom of cross-bar 94, each one of a pair being on opposite sides of body 93. Suitable braking means 97 are mounted on block 95.

Mounted on the bottom of block 95 at the approximate center thereof is ring 98. Cable 99 forms a bight 100 around and through ring 98 and is then slidably disposed in eye 101, rigidly mounted on frame 70.

Mounted externally on one side wall 15 and projecting into storage compartment 11 is a thermostatically controlled alarm system 200 of standard design, including a thermostat 201 disposed in storage compartment 11 and a signal light, bell, or other warning device 202 connected therewith. Signal light, bell, or other warning device 202 may be mounted in close proximity to said side wall 15, or may be mounted remotely therefrom, as for instance, on the bridge of the ship, or on the dashboard of the truck, or in the caboose of the railroad train being used to transport a container 10. Said alarm system 200 is arranged so that a rise in temperature inside storage compartment 11 will react on thermostat 201, which in turn will activate alarm device 202 to give warning of said rise in temperature, indicating an equipment failure.

Flanged gasket 41 on vent stack 40 is designed so that it will nest into the vent stack 40 of a second container stacked on the first container 10 so as to form a continuous vent stack. Shown in Figure 8 is a form of vent stack arrangement adaptable for use when one container cannot be stacked directly on another, or when it is desired to connect a vent stack 40 to the normal vent system on a ship. In such case, flexible tube 300 is disposed between flanged gasket 41 of one container and the bottom 301 of a vent stack 40 of a second container, so that again a continuous vent stack is provided. It will be understood that reference 301 may also pertain to the bottom of a vent stack of a ship's venting system rather than the bottom of a second container vent stack.

Mounted in frame 70 in series with evaporator 71 is a blower 400 having access, by way of passageway 401 and opening 402 in divider wall 13, to storage compartment 11, and arranged so that air treated by evaporator 71 will be blown into storage compartment 11, setting up a current of air which returns through opening 30 to evaporator 71 in recognized manner.

Bottom 17 has a plurality of recesses 500 therein. Pivotally mounted in or adjacent to said recesses 500 are hooks 501 having the uniform portions 502 thereof freely disposed, preferably downwardly, in said recesses 500. Hooks 501 may be releasably retained within recess 500 by leaf springs 503.

Recessed openings 600 are disposed in top 16 of a container 10 in such a manner as to be in alignment with recesses 500 of another container to be stacked thereon. Disposed in recesses 600 are bars 601. Pivotally mounted externally on side walls 15 are lever arms 602. Lever arms 602 are mounted on shafts 603 which project into recesses 600, and on the projecting ends of said shafts 603 are mounted cams 604 disposed so that hooks 501 of one container 10 may be freed from leaf springs 503, dropped into matching recesses 600 of another container 10 on which the first container 10 is stacked, disposed around bar 601, and locked in that position by cams 604. Said hooks 501 may be released from their locked position on rods 601 by movement of lever arms 602 which in turn cams 604 so as to free uniform portions 502 from bars 601.

In addition to being adaptable for use in locking stacked containers to each other, it will be understood that hooks 501 will be similarly available for locking containers on the platform of a truck or freight car, or on the deck of a ship's hold, by providing recesses, bars, lever arms and camming surfaces similar to recesses 600, bars 601, lever arms 602, and camming surfaces 604 on said platforms or deck.

Bottom 17 is also provided with a plurality of open-end channels 700 adapted to receive the tines of a lift truck. Top 16 may also be provided with a plurality of recesses 800, in which are disposed bars 801 suitable for attachment of cargo crane, davit, or other hoist hooks, not shown.

A power source 900, generally separate from container 10, is suitably provided, and connected to each container 10 by a connection 901.

In lieu of the dry cargo storage compartment 11 shown in the drawings, a leakproof tank for liquid cargo may be utilized, in which case side walls 15, top 16, bottom 17, the lower portion of front wall 18, doors 21, and edges 22 will be leakproofed as well as temperature-insulated. In such case a coil 1000 will be inserted in storage compartment 11; a pump 1001 will be substituted for blower 400; and opening 30 will be tightly sealed, except that leads 1002 and 1003 to and from coil 1000 will be disposed in leakproof openings in said seal, so that in lieu of air temperature and humidity control, liquid coil temperature control will be substituted.

In operation, assume that a container 10 is to be used to transport a cargo of beef from a slaughterhouse inland in Australia to a cold storage warehouse in Chicago, Illinois. Container 10 is moved to the refrigerated section of the slaughterhouse where the beef is stored. Doors 21 are opened and the beef to be shipped is packed in storage compartment 11. When packing is completed, doors 21 are then locked and sealed in closed position, not to be reopened until container 10 and its contents reach their ultimate destination, which is the cold storage warehouse in Chicago. Container 10, so locked, is then placed on a truck having a suitable power unit 900, which is connected to temperature and humidity control unit 74, which in turn is set for the desired humidity and temperature. Container 10 is then securely fastened to the truck platform by means of hooks 501, in the manner hereinabove described.

Container 10 is then transported by truck to a railhead in Australia, where it is disconnected from the truck platform and the power supply unit 900 on the truck and moved to a flatcar. It is then securely fastened to the floor of the freight car similar to the manner in which it was fastened to the platform of the truck, and promptly connected to a power supply unit 900 in the manner illustrated in Figure 2 of the drawings. The container, thus mounted on the freight car, is transported to ship-side, where it is again disconnected from the freight car and the power supply unit thereon, moved, perhaps by means of a lift truck, the tines of which are inserted in channels 700 for that purpose, and then swung by means of a cargo hoist attached to bars 801 in recesses 800 into the hold of a ship. In the ship's hold the container is securely fastened to the deck of the hold in a manner similar to that in which it was fastened to the platform of the truck and railroad car, and again promptly connected to a power supply unit 900 aboard the ship.

During transportation, the alarm system 200 may activate the alarm 202 mounted, say, on the dashboard of the truck, in the caboose of the train of which the freight car was a part, or on the bridge of the ship, because, whether or not the container has been stacked with other similar containers, if malfunction of the temperature and humidity control equipment should occur, the rise in temperature within the storage compartment 11 will activate the alarm. Thereupon, door 33 may be dropped into the open position shown in Figure 18, by the action of winch 37. Frame 70 may then be slid out from compartment 12, and a serviceman may climb on rungs 69, step out on door 33 which is held in position by safety chains 38, and may inspect the temperature and humidity control equipment contained in frame 70, which will be easily accessible to him. If desired, the entire frame 70 may be lowered and completely removed, so that the temperature and humidity control equipment may be completely replaced. After repair or replacement, frame 70 will be slid back into compartment 12 and door 33 will be closed again.

As shown particularly in Figure 3, two or more containers may be stacked one upon the other, in which case venting stacks 40 of the stacked containers form a continuous vent which, if desired, may be connected by a flexible vent tube such as that illustrated in Figure 8, to the normal hold venting system of the ship.

Due to the self-bailing construction of vent stack 40, if during sea shipment rough weather is encountered, and water finds its way into venting stack 40, door 42 may be opened and lowered to rest on seat 45, whereupon any water accumulating in vent stack 40 will be automatically discharged therefrom. Similarly, if water gets into air intake stack 60, the self-bailing construction of intake 60 will cause the water to flow out through opening 64.

On arrival of the ship at the port of debarkation, say, San Francisco, container 10 is disconnected from power supply unit 900 in the ship, released from its locked position on the hold deck, or on another container on which it was stacked, lifted by cargo hoist in the manner hereinabove described, and placed upon a second railroad car, and then on a transfer truck, in the manner hereinabove described. Upon arrival at the cold storage warehouse in Chicago, the container is disconnected from the truck and the power unit 900 thereon, and placed in the cold storage area of the warehouse, where, for the first time, doors 21 will be unsealed and opened to permit the removal of the beef cargo without substantial temperature or humidity change from its original setting in Australia, and with no intermediate handling. The power unit illustrated in Figure 1 is an electrical power unit, but any other type of power unit and temperature and humidity control equipment, such as gas, may readily be used. It will also be recognized that any form of temperature transfer between temperature and humidity control equipment and storage compartment 11, whether of the air condenser-blower type shown in the drawings, of an evaporator coil type, or other transfer means, may be utilized.

If an electric source of power is used, the temperature and humidity control equipment will be equipped for multi-voltage, A.C. or D.C. operation, to meet the requirements of varied power supply units which differ in various countries and in various means of transportation.

Although the invention herein has been shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent structures and devices.

We claim:

1. A portable storage and shipping container which comprises: a portable container; an insulated storage compartment in said container; insulated access doors to said storage compartment; an equipment compartment in said container adjacent to said storage compartment; a hinged door mounted on said equipment compartment so as to give access to said equipment compartment and to serve as a platform when in open position; a winch mounted on said container adjacent said equipment compartment door; a cable disposed between said winch and said door, and mounted on said door and on said winch; safety stop chains, disposed between said equipment compartment and said door, and rigidly mounted on said compartment and said door; temperature environment and humidity control means mounted in said equipment compartment; air passage means between said temperature environment and humidity control means and said storage compartment; a vent stack in said container adjacent said equipment compartment adapted to exhaust warm air from said equipment compartment; and vent means interconnecting said equipment compartment and said vent stack.

2. A storage and shipping container which comprises: a container; an insulated storage compartment in said container; an equipment compartment in said container adjacent to said storage compartment; temperature environment and humidity control means mounted in said equipment compartment; air passage means between said temperature environment and humidity control means and said storage compartment; a vent stack in said container adjacent said equipment compartment, having an upper open end and adapted to exhaust warm air from said equipment compartment; an upwardly and inwardly directed flanged gasket mounted at the upper open end of said stack; a hinged door at the bottom of said vent stack, adapted to open inwardly and to act as a water discharge chute; vent means interconnecting said equipment compartment and said vent stack; and a flutter valve mounted on said vent means and adapted to prevent the entrance of water into said vent means.

3. A portable storage and shipping container which comprises: a portable container; an insulated storage compartment in said container; an equipment compartment in said container adjacent to said storage compartment; temperature environment and humidity control means mounted in said equipment compartment; air passage means between said temperature environment and humidity control means and said storage compartment; a vent stack in said container adjacent said equipment compartment adapted to exhaust warm air from said equipment compartment; a louvered stack disposed in said vent stack; an air passage between said louvered stack and said equipment compartment; baffles mounted in said louvered stack adjacent the louvers thereof; a water discharge outlet at the base of said louvered stack; and vent means interconnecting said equipment compartment and said vent stack.

4. A portable storage and shipping container which comprises: a portable cubical container having a front wall, a rear wall, two side walls, a top and a bottom; an insulated storage compartment in said container; an equipment compartment in said container adjacent the front wall thereof and adjacent to said storage compartment; temperature environment and humidity control means mounted in said equipment compartment; air passage means in said container between said temperature environment and humidity control means and said storage compartment; a vent stack in said container adjacent said equipment compartment adapted to exhaust warm air from said equipment compartment; vent means in said container interconnecting said equipment compartment and said vent stack; a recess in said front wall of the container; and ladder rungs disposed in said recess so as to give ready access to said equipment compartment.

5. A portable storage and shipping container which comprises: a portable container; an insulated storage compartment in said container; an equipment compartment in said container adjacent to said storage compartment; a frame slidably mounted in said equipment compartment; an evaporator, a compressor and a condenser mounted in said frame; hoist means, mounted in said equipment compartment, adapted to raise and lower said frame; air passage means between said evaporator and said storage compartment; a vent stack in said container adjacent said equipment compartment adapted to exhaust warm air from said equipment compartment; and vent means interconnecting said condenser and said vent stack.

6. A portable storage and shipping container which comprises: a portable cubical container having a front wall, a rear wall, two side walls, a top and a bottom; a plurality of recesses disposed in the bottom of the container and spaced apart from each other; a hook pivotally disposed in each of said recesses; a spring mounted in each of said recesses and adapted to releasably retain each of said hooks in said recesses; a plurality of recesses disposed in the top of the container and spaced apart from each other in matching position with the recesses in the bottom of the container; a bar mounted transversely in each of said top recesses and each adapted to receive and hold a hook in the bottom of the second container stacked on the first container; an insulated storage compartment in said container; an equipment compartment in said container adjacent said storage compartment; temperature environment and humidity control means mounted in said equipment compartment; air passage means in said container between said temperature environment and humidity control means and said storage compartment; a vent stack in said container adjacent said equipment compartment adapted to exhaust warm air from said equipment compartment; vent means in said container interconnecting said equipment compartment and said vent stack; a recess in said front wall of the container; and ladder runs disposed in said recess so as to give ready access to said equipment compartment.

7. A portable storage and shipping container which comprises: a portable cubical container having a front wall, a rear wall, two side walls, a top and a bottom; a plurality of tine channels mounted transversely in said bottom and adapted to receive the tines of a lift truck; a plurality of recesses in the top of said container, spaced apart from each other; a bar mounted transversely in each of said recesses and adapted to receive cargo hoist means; an insulated storage compartment in said container; an equipment compartment in said container adjacent said storage compartment; temperature environment and humidity control means mounted in said equipment compartment; air passage means in said container between said temperature environment and humidity control means and said storage compartment; a vent stack in said container adjacent said equipment compartment adapted to exhaust warm air from said equipment compartment; vent means in said container interconnecting said equipment compartment in said vent stack; a recess in said front wall of the container; and ladder rungs disposed in said recess so as to give ready access to said equipment compartment.

8. A storage and shipping container which comprises: a container; an insulated storage compartment in said container; an equipment compartment in said container adjacent to said storage compartment; temperature environment and humidity control means mounted in said equipment compartment; a thermostatically controlled alarm system associated with said temperature environment and humidity control means adapted to give warning of failure of said temperature environment and humidity control means; air passage means between said temperature environment and humidity control means and said storage compartment; a vent stack in said container adjacent said equipment compartment, having an upper open end and adapted to exhaust warm air from said equipment compartment; an upwardly and inwardly directed flanged gasket mounted at the upper open end of said stack; a hinged door at the bottom of said vent stack, adapted to open inwardly and to act as a water discharge chute; vent means interconnecting said equipment compartment and said vent stack; and a flutter valve mounted on said vent means and adapted to prevent the entrance of water into said vent means.

References Cited in the file of this patent

UNITED STATES PATENTS

| | | |
|---|---|---|
| 2,027,845 | Speicher | Jan. 14, 1936 |
| 2,180,915 | Stebbins | Nov. 21, 1939 |
| 2,203,439 | Oliver | June 4, 1940 |
| 2,318,893 | Smith | May 11, 1943 |
| 2,363,974 | Kirkpatrick | Nov. 28, 1944 |
| 2,538,664 | Benz | Jan. 16, 1951 |
| 2,593,916 | Peff | Apr. 22, 1952 |
| 2,738,655 | Gumpper | Mar. 20, 1956 |
| 2,872,792 | Corhanidis | Feb. 10, 1959 |

FOREIGN PATENTS

| | | |
|---|---|---|
| 679,396 | Great Britain | Sept. 17, 1952 |